(12) United States Patent
Kim et al.

(10) Patent No.: US 12,347,905 B2
(45) Date of Patent: Jul. 1, 2025

(54) MEMBRANE-ELECTRODE ASSEMBLY AND METHOD FOR MANUFACTURING SAME

(71) Applicant: KOLON INDUSTRIES, INC., Seoul (KR)

(72) Inventors: Jung Ho Kim, Seoul (KR); Jun Young Kim, Seoul (KR); Kah-Young Song, Seoul (KR); Nakwon Kong, Seoul (KR); Jusung Lee, Seoul (KR); Kyoungsik Nam, Seoul (KR); Chanmi Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 541 days.

(21) Appl. No.: 17/758,572

(22) PCT Filed: Dec. 1, 2021

(86) PCT No.: PCT/KR2021/017999
§ 371 (c)(1),
(2) Date: Jul. 9, 2022

(87) PCT Pub. No.: WO2022/131629
PCT Pub. Date: Jun. 23, 2022

(65) Prior Publication Data
US 2023/0057062 A1 Feb. 23, 2023

(30) Foreign Application Priority Data
Dec. 16, 2020 (KR) .......... 10-2020-0176531

(51) Int. Cl.
*H01M 8/1004* (2016.01)
*H01M 4/88* (2006.01)

(52) U.S. Cl.
CPC ......... *H01M 8/1004* (2013.01); *H01M 4/881* (2013.01); *H01M 4/8828* (2013.01); *H01M 4/8882* (2013.01)

(58) Field of Classification Search
CPC .................................................. H01M 8/1004
See application file for complete search history.

(56) References Cited

U.S. PATENT DOCUMENTS

2012/0189924 A1   7/2012   Gyoten

FOREIGN PATENT DOCUMENTS

| CN | 1492531 A | 4/2004 |
| CN | 101073174 A | 11/2007 |

(Continued)

OTHER PUBLICATIONS

JP-2008311197-A translation (Year: 2008).*

(Continued)

*Primary Examiner* — Brian R Ohara
(74) *Attorney, Agent, or Firm* — Harvest IP Law, LLP

(57) ABSTRACT

Disclosed are: a membrane-electrode assembly having enhanced adhesion and interfacial durability between a polymer electrolyte membrane and electrodes; and a method for manufacturing a membrane-electrode assembly, in which, in forming electrodes by directly coating a catalyst slurry on a polymer electrolyte membrane, adhesion and interfacial durability between the polymer electrolyte membrane and the electrodes can be enhanced without a separate additional step, thus improving both the durability and the productivity of the membrane-electrode assembly. The method comprises the steps of: dispersing a catalyst and an ion conductor in a dispersion medium to obtain a catalyst slurry; applying the catalyst slurry onto a polymer electrolyte membrane; and drying the catalyst slurry applied onto the polymer electrolyte membrane to form an electrode. The (Continued)

dispersion medium is a solvent capable of forming a plurality of grooves on a surface of the polymer electrolyte membrane, and, when the electrode is formed through the drying step, at least some of the grooves are filled with the catalyst, the ion conductor, or a mixture thereof.

13 Claims, 8 Drawing Sheets

(56) References Cited

FOREIGN PATENT DOCUMENTS

| | | | |
|---|---|---|---|
| CN | 100405653 C | | 7/2008 |
| CN | 101488569 A | | 7/2009 |
| JP | 2008159426 A | | 7/2008 |
| JP | 2008311197 A | * | 12/2008 |
| KR | 20020007581 A | | 1/2002 |
| KR | 20040036461 A | | 4/2004 |
| KR | 20090116828 A | | 11/2009 |
| KR | 20200001492 A | | 1/2020 |
| KR | 20200002144 A | | 1/2020 |
| TW | 201926781 A | | 7/2019 |
| TW | 202032840 A | | 9/2020 |
| WO | 9939841 A1 | | 8/1999 |

OTHER PUBLICATIONS

The office action dated Mar. 28, 2024 related to the corresponding Korean Patent application.
Molded, High Surface Area Polymer Electrolyte Membranes from Cured Liquid Precursors, Zhilian Zhou et al., Journal of the American Chemical Society, vol. 128, Issue 39, pp. 12964-12972.
The office action dated Mar. 17, 2025 related to the corresponding Chinese Patent application.
TW office action dated Jul. 26, 2022.

* cited by examiner

MEMBRANE-ELECTRODE ASSEMBLY AND METHOD FOR MANUFACTURING SAME

CROSS REFERENCE TO RELATED APPLICATIONS

This application is a National Stage of International Application No. PCT/KR2021/017999 filed Dec. 1, 2021, claiming priority based on Korean Patent Application No. 10-2020-0176531 filed Dec. 16, 2020, the disclosures of which are incorporated herein by reference in their entireties.

TECHNICAL FIELD

The present disclosure relates to a membrane-electrode assembly manufacturing method, and more particularly to a membrane-electrode assembly with increased adhesive strength between a polymer electrolyte membrane and an electrode and improved durability of the interface therebetween and a membrane-electrode assembly manufacturing method capable of, in directly coating a catalyst slurry on a polymer electrolyte membrane to form an electrode, increasing the adhesive strength between the polymer electrolyte membrane and the electrode and durability of the interface therebetween without a separate additional process, whereby it is possible to improve both durability and productivity of a membrane-electrode assembly.

BACKGROUND ART

A polymer electrolyte membrane fuel cell (PEMFC), which is configured to generate electricity using a structure in which unit cells, each of which includes a membrane-electrode assembly (MEA) and a separator (also referred to as a bipolar plate), are stacked, has attracted attention as a next-generation energy source capable of replacing fossil fuels due to high energy efficiency and environmentally friendly characteristics thereof.

The membrane-electrode assembly generally includes an anode (also referred to as a fuel electrode), a cathode (also referred to as an air electrode), and a polymer electrolyte membrane disposed therebetween.

When fuel such as hydrogen gas is supplied to the anode, hydrogen ions ($H^+$) and electrons ($e^-$) are generated at the anode as the result of hydrogen oxidation reaction. The generated hydrogen ions are transferred to the cathode via the polymer electrolyte membrane, and the generated electrons are transferred to the cathode via an external circuit. Oxygen supplied to the cathode is bonded with the hydrogen ions and the electrons, and water is generated as the result of reduction.

Low durability of the interface between a polymer electrolyte membrane and an electrode causes deterioration in performance of a membrane-electrode assembly due to long-term operation of a fuel cell. Low durability of the interface between the polymer electrolyte membrane and the electrode results from insufficient adhesive strength therebetween.

In order to increase the adhesive strength between the polymer electrolyte membrane and the electrode, forming irregularities on the surface of the polymer electrolyte membrane to increase surface roughness thereof using (i) a physical method, such as stamp pressing, sandpapering, sandblasting, or rubbing, or (ii) a physical and chemical method, such as plasma treatment or corona discharge treatment, has been proposed.

Since a separate additional process of providing surface roughness to the polymer electrolyte membrane is needed, however, the above methods are not preferable in terms of simplicity in process and limit improvement in productivity of a membrane-electrode assembly. In addition, the adhesive strength between a polymer electrolyte membrane and an electrode of a membrane-electrode assembly manufactured using the above methods is not sufficiently high, whereby satisfactory durability of the interface therebetween cannot be secured.

DISCLOSURE

Technical Problem

Therefore, the present disclosure relates to a membrane-electrode assembly capable of solving problems due to limitations and shortcomings of the related technology described above and a method of manufacturing the same.

It is an object of the present disclosure to provide a membrane-electrode assembly with increased adhesive strength between a polymer electrolyte membrane and an electrode and improved durability of the interface therebetween.

It is another object of the present disclosure to provide a membrane-electrode assembly manufacturing method capable of, in directly coating a catalyst slurry on a polymer electrolyte membrane to form an electrode, increasing the adhesive strength between the polymer electrolyte membrane and the electrode and durability of the interface therebetween without a separate additional process, whereby it is possible to improve both durability and productivity of a membrane-electrode assembly.

In addition to the above objects, other features and advantages of the present disclosure will be described hereinafter, or will be clearly understood by those skilled in the art to which the present disclosure pertains from the following description thereof.

Technical Solution

In accordance with an aspect of the present disclosure, there is provided a membrane-electrode assembly including a polymer electrolyte membrane and a first electrode on a first surface of the polymer electrolyte membrane, wherein the first electrode includes a first catalyst and a first ion conductor, a plurality of grooves are randomly formed on the first surface, each of the grooves has a depth of 5 µm or less and a width of 10 µm or less, each of the grooves is filled with a portion of the first electrode, and the content of the first ion conductor in the portion of the first electrode with which the grooves are filled is higher than the content of the first ion conductor in the remaining portion of the first electrode.

The difference between the content of the first ion conductor in the portion of the first electrode with which the grooves are filled and the content of the first ion conductor in the remaining portion of the first electrode may be 2 to 12% of the content of the first ion conductor in the remaining portion of the first electrode.

In accordance with another aspect of the present disclosure, there is provided a membrane-electrode assembly manufacturing method including dispersing a first catalyst and a first ion conductor in a first dispersion medium in order to obtain a first catalyst slurry, coating the first catalyst slurry on a first surface of a polymer electrolyte membrane, and drying the first catalyst slurry coated on the first surface in order to form a first electrode, wherein the first dispersion medium includes (i) a first ingredient capable of partially melting the polymer electrolyte membrane at the first surface thereof or causing deformation of the first surface to form a plurality of grooves on the first surface and (ii) a second ingredient different from the first ingredient, the first ingredient is alcohol, acetic acid, propionic acid, dimethylacetamide, or a mixture of two or more thereof, the alcohol is methanol, ethanol, propanol, ethoxyethanol, butanol, or a mixture of two or more thereof, the second ingredient is water, N-methyl pyrrolidone (NMP), dimethyl sulfoxide (DMSO), tetrahydrofuran (THF), or a mixture of two or more thereof, the content of the first dispersion medium in the first catalyst slurry is 83 to 98 wt. %, the content of the first ingredient in the first dispersion medium is 55 to 80 wt. %, and when the first electrode is formed through the drying step, at least some of the grooves are filled with the first catalyst, the first ion conductor, or a mixture thereof.

The first catalyst slurry may be coated on the first surface to a coating thickness of 10 to 200 μm.

The drying step may be performed at a temperature of 50 to 150° C. for 10 to 300 seconds.

(i) The content of the first dispersion medium in the first catalyst slurry, (ii) the content of the first ingredient in the first dispersion medium, (iii) the coating thickness of the first catalyst slurry, (iv) the temperature of the drying step, and (v) the time of the drying step may be set such that each of the grooves has a depth of 5 μm or less and a width of 10 μm or less.

The dispersion step may be performed using at least one selected from the group consisting of an ultrasonic homogenizer, a ball mill, a roll mill, a resonant acoustic mixer, a high-pressure homogenizer, a planetary mixer, and a homogeneous mixer.

The polymer electrolyte membrane may include a fluorine-based ion conductor.

The drying step may be performed by hot-air drying, infrared drying, or hot-plate drying.

The method may further include coating a second catalyst slurry on a second surface of the polymer electrolyte membrane opposite the first surface after forming the first electrode and drying the second catalyst slurry coated on the second surface in order to form a second electrode.

The step of coating the first catalyst slurry on the first surface may be performed while a protective film is attached to the second surface of the polymer electrolyte membrane.

The method may further include removing the protective film from the second surface before coating the second catalyst slurry on the second surface.

The method may further include attaching a first protective sheet to the first surface having the first electrode formed thereon before removing the protective film from the second surface.

The method may further include attaching a second protective sheet to the second surface having the second electrode formed thereon.

The method may further include attaching a first masking film having a first window to the first surface before coating the first catalyst slurry on the first surface, removing the first masking film after forming the first electrode, attaching a second masking film having a second window to the second surface before coating the second catalyst slurry on the second surface, and removing the second masking film after forming the second electrode, wherein the step of coating the first catalyst slurry on the first surface may be performed by coating the first catalyst slurry on the portion of the first surface exposed through the first window, and the step of coating the second catalyst slurry on the second surface may be performed by coating the second catalyst slurry on the portion of the second surface exposed through the second window.

The general description of the present disclosure given above is provided merely to illustrate or describe the present disclosure, and does not limit the scope of rights of the present disclosure.

Advantageous Effects

According to the present disclosure, grooves each having a predetermined size randomly arranged on the surface of a polymer electrolyte membrane are filled with a portion of an electrode formed on the surface, whereby the adhesive strength between the polymer electrolyte membrane and the electrode may be higher than in a conventional art, and therefore it is possible to provide a membrane-electrode assembly having higher durability of the interface between the polymer electrolyte membrane and the electrode than in the conventional art.

Conventional physical or physicochemical methods of increasing the adhesive strength between a polymer electrolyte membrane and an electrode in order to improve durability of the interface therebetween deteriorate simplicity in process and productivity of a membrane-electrode assembly, whereas a membrane-electrode assembly manufacturing method according to the present disclosure is capable of, in directly coating a catalyst slurry on a polymer electrolyte membrane to form an electrode, increasing the adhesive strength between the polymer electrolyte membrane and the electrode and durability of the interface therebetween without a separate additional process. In the method according to the present disclosure, therefore, it is possible to manufacture a membrane-electrode assembly having excellent durability in a relatively simple way with high productivity.

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

BEST MODE

Hereinafter, embodiments of the present disclosure will be described in detail with reference to the accompanying drawings. However, the following embodiments are illustratively provided merely for clear understanding of the present disclosure and do not limit the scope of the present disclosure.

Figure 1A:
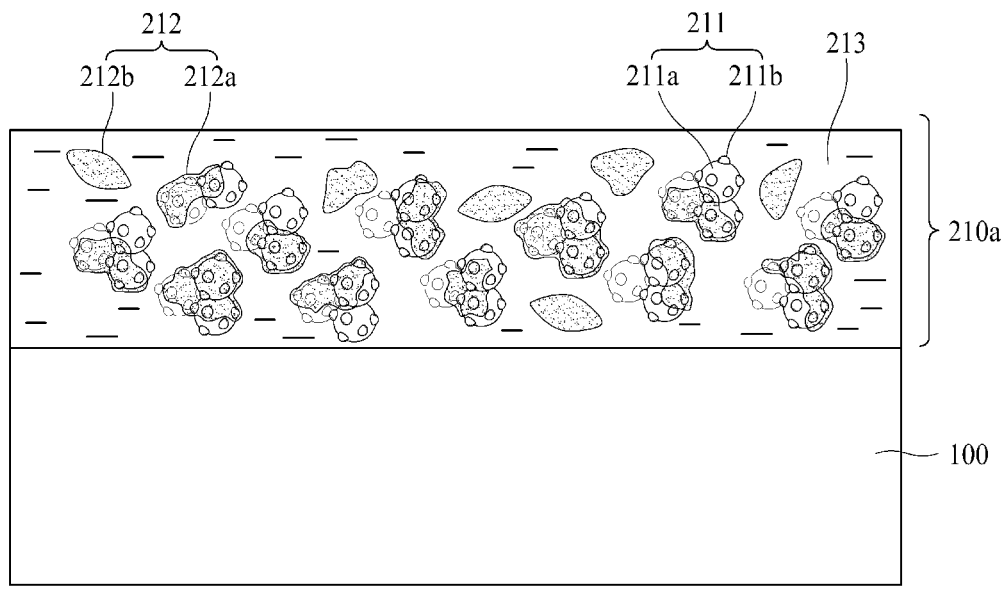
FIGS. 1a to 1c schematically illustrate a process in which an electrode is formed on a polymer electrolyte membrane according to a method of the present disclosure.
Figure 1B:
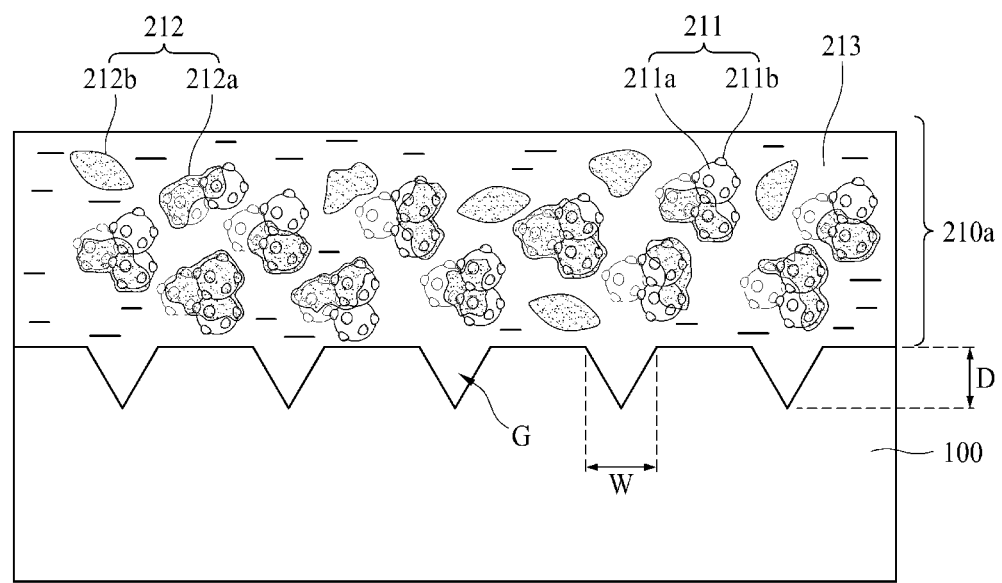
Figure 1C:
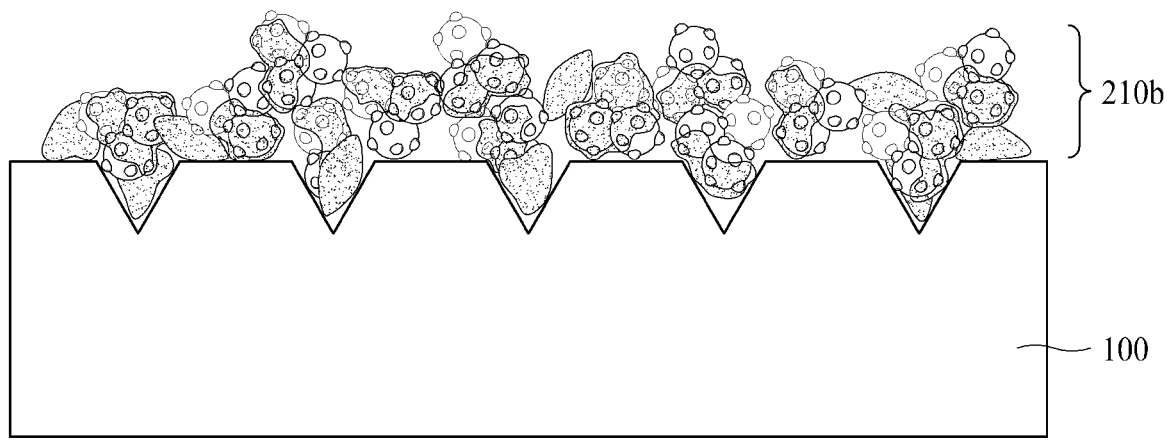

FIGS. 1a to 1c schematically illustrate a process in which an electrode is formed on a polymer electrolyte membrane according to a method of the present disclosure.

As shown in FIG. 1a, a membrane-electrode assembly manufacturing method according to the present disclosure includes a step of coating a first catalyst slurry 210a on a first surface of a polymer electrolyte membrane 100.

According to the present disclosure, a first catalyst 211 and a first ion conductor 212 are dispersed in a first dispersion medium 213 in order to obtain the first catalyst slurry 210a. A portion 212a of the first ion conductor 212 is coated on at least a portion of the first catalyst 211, and the remainder 212b thereof exists in the form of a free ion conductor that is not coated on the first catalyst 211.

The first catalyst 211 may include a support 211a and a plurality of catalyst metal particles 211b dispersed on the support 211a.

The support 211a may be (i) a carbon-based support, (ii) a porous inorganic oxide support, such as zirconia, alumina, titania, silica, or ceria, or (iii) a zeolite support.

For example, the carbon-based support may be graphite, super P, carbon fiber, carbon sheet, carbon black, Ketjen black, Denka black, acetylene black, carbon nanotube (CNT), carbon sphere, carbon ribbon, fullerene, active carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, or a combination of two or more thereof.

The catalyst metal particles 211b may include platinum or a platinum-based alloy. The platinum-based alloy may be (i) a binary alloy, such as Pt—Co, Pt—Pd, Pt—Mn, Pt—Sn, Pt—Mo, Pt—Cr, Pt—W, Pt—Ir, Pt—Ru, Pt—Ni, or Pt—Fe, (ii) a ternary alloy, such as Pt—Ru—W, Pt—Ru—Ni, Pt—Ru—Mo, Pt—Ru—Ir, Pt—Co—Mn, Pt—Co—Ni, Pt—Co—Fe, Pt—Co—Ir, Pt—Co—S, Pt—Co—P, Pt—Fe—Ir, Pt—Fe—S, Pt—Fe—P, Pt—Au—Co, Pt—Au—Fe, Pt—Au—Ni, Pt—Ni—Ir, or Pt—Cr—Ir, or (iii) a quaternary alloy, such as Pt—Ru—Rh—Ni, Pt—Ru—Sn—W, or Pt—Ru—Ir—Ni. However, the present disclosure is not limited thereto.

The first ion conductor 212 dispersed in the first dispersion medium 213 together with the first catalyst 211 performs not only a hydrogen ion transfer function in a first electrode 210b but also the function of a binder that increases the adhesive strength between the polymer electrolyte membrane 100 and the first electrode 210b.

The first ion conductor 212 may be a fluorine-based or hydrocarbon-based ion conductor having an ion exchange group. The ion exchange group may be at least one proton exchange group selected from the group consisting of a sulfonic acid group, a carboxyl group, a boronic acid group, a phosphate group, an imide group, a sulfonimide group, a sulfonamide group, and a sulfonic acid fluoride group.

There are poly(perfluorosulfonic acid) and poly(perfluorocarboxylic acid) as examples of the fluorine-based ion conductor. However, the present disclosure is not limited thereto.

There are sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, and sulfonated polyarylene ether sulfone ketone as examples of the hydrocarbon-based ion conductor. However, the present disclosure is not limited thereto.

The first dispersion medium 213 according to the present disclosure is a solvent that partially and slightly removes the polymer electrolyte membrane 100 from the first surface or causes the first surface to be deformed, e.g. wrinkled, whereby a plurality of grooves may be formed on the first surface. The term "groove" used herein is a concept that encompasses angular-shaped grooves, curved-shaped grooves, or hybrid-shaped grooves caused due to partial removal or surface deformation, such as wrinkles, of the polymer electrolyte membrane 100.

For example, the first dispersion medium 213 may include (i) a first ingredient, such as alcohol, acetic acid, propionic acid, dimethylacetamide, or a mixture of two or more thereof, and (ii) a second ingredient different from the first ingredient, such as water, N-methyl pyrrolidone (NMP), dimethyl sulfoxide (DMSO), tetrahydrofuran (THF), or a mixture of two or more thereof. The alcohol may be methanol, ethanol, propanol, ethoxyethanol, butanol, or a mixture of two or more thereof.

The content of the first dispersion medium 213 in the first catalyst slurry 210a may be 83 to 98 wt. %. If the content of the first dispersion medium 213 deviates from the above-specified range, it is difficult for grooves to be formed on the surface of the polymer electrolyte membrane 100.

The content of the first ingredient in the first dispersion medium 213 may be 55 to 80 wt. %.

The first catalyst 211 and the first ion conductor 212 may be dispersed in the first dispersion medium 213 using at least one selected from the group consisting of an ultrasonic homogenizer, a ball mill, a roll mill, a resonant acoustic mixer, a high-pressure homogenizer, a planetary mixer, and a homogeneous mixer.

The polymer electrolyte membrane 100 includes an ion conductor. Since the above-specified ion conductors that may be used to form the first catalyst slurry 210a may be used for the polymer electrolyte membrane 100, a detailed description of the ion conductor for the polymer electrolyte membrane 100 will be omitted. The ion conductor included in the polymer electrolyte membrane 100 may be identical to or different from the first ion conductor 212 of the first catalyst slurry 210a.

In order to well form a plurality of grooves G on the first surface of the polymer electrolyte membrane 100 using the first dispersion medium 213 according to the present disclosure (i.e. in order to sufficiently increase roughness of the first surface), it may be preferable for the polymer electrolyte membrane 100 to include a fluorine-based ion conductor, rather than a hydrocarbon-based ion conductor. However, some (e.g. dimethylacetamide) of the above-specified examples of the first ingredient of the first dispersion medium 213 may increase surface roughness of a hydrocarbon-based polymer electrolyte membrane just as sufficiently as a fluorine-based polymer electrolyte membrane.

The polymer electrolyte membrane 100 may be (i) a single membrane substantially made of only an ion conductor or (ii) a reinforced composite membrane configured such that pores of a porous support are filled with the ion conductor.

The reinforced composite membrane may include two pure layers substantially made of only an ion conductor and a coexistence layer of the porous support and the ion conductor existing therebetween. In a reinforced composite membrane type polymer electrolyte membrane 100, a ratio of the apparent volume of the porous support (i.e. the volume of the coexistence layer) to the entire volume of the polymer electrolyte membrane 100 may be 5 to 90%.

The first dispersion medium 213 according to the present disclosure includes 55 to 80 wt. % of the first ingredient that may partially and slightly remove the ion conductor of the polymer electrolyte membrane 100 or may cause surface deformation, such as wrinkles, of the polymer electrolyte membrane (i.e. alcohol, acetic acid, propionic acid, dimethylacetamide, or a mixture of two or more thereof). As illustrated in FIG. 1b, therefore, a plurality of grooves G may be irregularly formed on the first surface of the polymer electrolyte membrane 100, whereby surface roughness of the polymer electrolyte membrane may be increased.

As previously described, alcohol may be methanol, ethanol, propanol, ethoxyethanol, butanol, or a mixture of two or more thereof.

The content of the first ingredient in the first dispersion medium 213 may be 55 to 80 wt. %.

If the content of the first ingredient in the first dispersion medium 213 is less than 55 wt. %, it is difficult for grooves to be formed on the surface of the polymer electrolyte membrane 100. Consequently, surface roughness of the polymer electrolyte membrane 100 may not be sufficiently increased. As a result, the adhesive strength between the polymer electrolyte membrane 100 and the first electrode 210b and durability of the interface therebetween may not be sufficiently increased.

If the content of the first ingredient in the first dispersion medium 213 is greater than 80 wt. %, on the other hand, the ion conductor of the polymer electrolyte membrane 100 is excessively removed or surface deformation, such as wrinkles, of the polymer electrolyte membrane is excessively caused, whereby excessively large grooves (i.e. grooves each having a depth of greater than 5 μm and a width of greater than 10 μm) are formed on the surface of the polymer electrolyte membrane 100. As a result, durability of the polymer electrolyte membrane 100 may be unintentionally lowered or interfacial bonding defects may occur.

The second ingredient, which is the other ingredient of the first dispersion medium 213 according to the present disclosure, may be an arbitrary ingredient commonly used to manufacture a catalyst slurry for membrane-electrode assemblies, e.g. (i) a hydrophilic solvent including water ($H_2O$) and/or (ii) an organic solvent selected from the group consisting of N-methyl pyrrolidone (NMP), dimethyl sulfoxide (DMSO), tetrahydrofuran (THF), and a mixture of two or more thereof.

In an embodiment of the present disclosure, the first catalyst slurry 210a may be coated on the first surface of the polymer electrolyte membrane 100 to a coating thickness of 10 to 200 μm, more specifically 20 to 200 μm.

If the coating thickness of the first catalyst slurry 210a is less than 10 μm, surface roughness of the polymer electrolyte membrane 100 and the electrode loading amount are not sufficiently increased. As a result, the adhesive strength between the polymer electrolyte membrane 100 and the first electrode 210b and durability of the interface therebetween are not sufficiently increased. If the coating thickness of the first catalyst slurry 210a is greater than 200 μm, on the other hand, the first dispersion medium 213 of the first catalyst slurry 210a is not completely removed in a subsequent drying process, whereby not only electrode formation defects are caused but also a subsequent process is adversely affected. In addition, the ion conductor of the polymer electrolyte membrane 100 is excessively removed by the first dispersion medium 213 or surface deformation, such as wrinkles, of the polymer electrolyte membrane is excessively caused (or excessively large grooves are formed), whereby durability of the polymer electrolyte membrane 100 may be unintentionally lowered or electrode formation defects may be caused.

In the present disclosure, a method of coating the first catalyst slurry 210a on the first surface of the polymer electrolyte membrane 100 is not particularly restricted as long as it is possible to control the coating thickness of the first catalyst slurry 210a within the above-specified range. For example, a coating method, such as slot-die coating, comma coating, or spray coating, may be used.

Subsequently, the first catalyst slurry 210a according to the present disclosure coated on the first surface of the polymer electrolyte membrane 100 is dried to form a first electrode 210b. The drying step may be performed by hot-air drying, infrared drying, or hot-plate drying.

When the first electrode 210b is formed through the drying step, as illustrated in FIG. 1c, at least some of the grooves G are filled with the first catalyst 211, the first ion conductor 212, or a mixture thereof.

As a result, according to the present disclosure, the contact area between the first electrode 210b and the polymer electrolyte membrane 100 is increased. That is, the first catalyst slurry 210a is directly coated on the polymer electrolyte membrane 100 to form the first electrode 210b, and it is possible to increase the adhesive strength between the polymer electrolyte membrane 100 and the first electrode 210b and durability of the interface therebetween without performing a separate additional process. According to the present disclosure, therefore, both durability and productivity of the membrane-electrode assembly may be improved.

In addition, according to the present disclosure, since a plurality of grooves G is formed on the first surface of the polymer electrolyte membrane 100 when the first electrode 210b is formed using the first catalyst slurry 210a, the portions of the first electrode 210b with which the grooves G are filled and the remaining portion thereof are different from each other in terms of the content of the first ion conductor 212. Specifically, the content of the first ion conductor 212 in the portions of the first electrode 210b with which the grooves G are filled is higher than the content of the first ion conductor 212 in the remaining portion of the first electrode 210b (e.g. 2 to 12% higher than the content of the first ion conductor 212 in the remaining portion).

In an embodiment of the present disclosure, the drying step of removing the first dispersion medium 213 from the first catalyst slurry 210a may be performed at a temperature of 50 to 150° C., more specifically 50 to 130° C., for 10 to 300 seconds, more specifically 10 to 200 seconds.

If the drying step is performed at a temperature lower than 50° C., the first dispersion medium 213 is not completely removed, whereby electrode formation defects are caused and a subsequent process is adversely affected. In addition, the residual first dispersion medium 213 excessively deeply penetrates into the polymer electrolyte membrane 100, thus excessively removing the ion conductor of the polymer electrolyte membrane 100 or causing excessive surface deformation, such as wrinkles, of the polymer electrolyte membrane (or forming excessively large grooves), whereby durability of the polymer electrolyte membrane 100 may be lowered or electrode formation defects may be caused. If the drying step is performed at a temperature higher than 150° C., on the other hand, the first dispersion medium 213 is rapidly evaporated, whereby partial removal of the ion conductor from the polymer electrolyte membrane 100 or surface deformation, such as wrinkles, of the polymer electrolyte membrane due to the first dispersion medium 213 is not sufficiently achieved. Consequently, surface roughness of the polymer electrolyte membrane 100 may not be sufficiently increased. As a result, the adhesive strength between the polymer electrolyte membrane 100 and the first electrode 210b and durability of the interface therebetween may not be sufficiently increased. Furthermore, a drying temperature higher than 100° C. may cause deformation and/or denaturation of the polymer electrolyte membrane 100, and may cause deterioration in performance and durability of a membrane-electrode assembly and a fuel cell, which are final products.

If the drying step is performed only for a time less than 10 seconds, some of the first dispersion medium 213 may not be evaporated but may remain, whereby electrode formation defects may be caused and a subsequent process may be adversely affected. In addition, the ion conductor of the polymer electrolyte membrane 100 may be excessively removed or surface deformation, such as wrinkles, of the polymer electrolyte membrane may be excessively caused due to the residual first dispersion medium 213, whereby durability of the polymer electrolyte membrane 100 may be greatly lowered or electrode formation defects may be caused. If the drying step is performed for a time greater than 300 seconds, on the other hand, not only may ionic conductivity of the polymer electrolyte membrane 100 be lowered but also productivity of the membrane-electrode assembly may be lowered due to deformation and/or denaturation of the polymer electrolyte membrane.

According to the present disclosure, in order to increase surface roughness of the polymer electrolyte membrane 100 without deterioration in durability and performance thereof, it is preferable for only the first surface of the polymer electrolyte membrane 100 or only the vicinity thereof to be affected by the first dispersion medium 213. For this reason, in an embodiment of the present disclosure, (i) the content of the first dispersion medium 213 in the first catalyst slurry 210a, (ii) the content of the first ingredient in the first dispersion medium 213, (iii) the coating thickness of the first catalyst slurry 210a, (iv) the temperature of the drying step, and (v) the time of the drying step may be set such that the first dispersion medium 213 cannot deform 70% or more of the thickness of the polymer electrolyte membrane 100 through the first surface thereof.

Alternatively or additionally, in order to increase surface roughness of the polymer electrolyte membrane 100 without deterioration in durability and performance thereof, a plurality of grooves G irregularly formed on the first surface of the polymer electrolyte membrane 100 may each have a depth D of 5 μm or less, preferably 0.05 to 5 μm, more preferably 0.1 to 4.5 μm, and a width W of 10 μm or less, preferably 0.5 to 10 μm, more preferably 1 to 9 μm. (i) The content of the first dispersion medium 213 in the first catalyst slurry 210a, (ii) the content of the first ingredient in the first dispersion medium 213, (iii) the coating thickness of the first catalyst slurry 210a, (iv) the temperature of the drying step, and (v) the time of the drying step may be set such that each of the grooves G has a depth D and a width within the above-specified ranges.

A membrane-electrode assembly according to the present disclosure manufactured as described above includes a polymer electrolyte membrane 100 and a first electrode 210b on a first surface of the polymer electrolyte membrane 100, wherein the first electrode 210b includes a first catalyst 211 and a first ion conductor 212, a plurality of grooves G is randomly formed on the first surface, and each of the grooves G has a depth D of 5 μm or less and a width W of 10 μm or less.

The depth D/width W of the grooves G may be obtained by measuring the depth D/width W of each groove G through observation of a sectional SEM photograph of a sample (2 cm×2 cm) and calculating the arithmetic mean of the measured values.

In addition, according to the present disclosure, the content of the first ion conductor 212 in the portions of the first electrode 210b with which the grooves G are filled is higher than the content of the first ion conductor 212 in the remaining portion of the first electrode 210b (e.g. 2 to 12% higher than the content of the first ion conductor 212 in the remaining portion).

Since the first ion conductor 212 naturally moves downwards during the process of drying the first catalyst slurry 210a coated on the polymer electrolyte membrane 100, a relatively high content of the first ion conductor 212 exists in the grooves G located lower than the normal surface of the polymer electrolyte membrane 100 (i.e. the surface having no grooves formed thereon). As a result, the adhesive strength between the polymer electrolyte membrane 100 and the first electrode 210b and durability of the interface therebetween may be increased.

The portion-specific content of the ion conductor in the first electrode 210b may be calculated as follows.

First, the content of the ion conductor in each of arbitrary five points of a sample electrode (2 cm×2 cm) is measured using a thermogravimetric analysis (TGA) method, and the arithmetic mean of the measured values is calculated to obtain the content of the first ion conductor 212 in the remaining portion of the first electrode 210b (i.e. the portion outside the grooves).

Subsequently, the remaining portion of the first electrode 210b is completely removed using a surface and interfacial cutting analysis system (SAICAS), whereby the portions of the first electrode 210b with which the grooves G are filled remain. The content of the ion conductor in each of the portions of the first electrode 210b with which the grooves G are filled is measured using the TGA method, and the arithmetic mean of the measured values is calculated to obtain the content of the first ion conductor 212 in the portions of the first electrode 210b with which the grooves G are filled. According to the present disclosure, the grooves G each having a predetermined size randomly arranged on the first surface of the polymer electrolyte membrane 100 are filled with a portion of the first electrode 210b formed on the first surface, whereby the adhesive strength between the polymer electrolyte membrane 100 and the first electrode 210b may be higher than in a conventional art, and therefore it is possible to provide a membrane-electrode assembly having higher durability of the interface between the polymer electrolyte membrane 100 and the first electrode 210b than in the conventional art.

A second electrode 220b may be formed on a second surface of the polymer electrolyte membrane 100 using substantially the same method as the method of forming the first electrode 210b.

For example, the membrane-electrode assembly manufacturing method according to the present disclosure may further include a step of coating a second catalyst slurry 220a on a second surface of the polymer electrolyte membrane 100 opposite the first surface after forming the first electrode 210b and a step of drying the second catalyst slurry 220a coated on the second surface in order to form a second electrode 220b.

The second catalyst slurry 220a may be obtained by dispersing a second catalyst and a second ion conductor in a second dispersion medium. The above-specified materials for the first catalyst 211 may be used for the second catalyst, the above-specified materials for the first ion conductor 212 may be used for the second ion conductor, and the above-specified compositions for the first dispersion medium 213 may be used for the second dispersion medium.

Hereinafter, a membrane-electrode assembly manufacturing method according to an embodiment of the present disclosure will be described with reference to FIG. 2.

Figure 2:
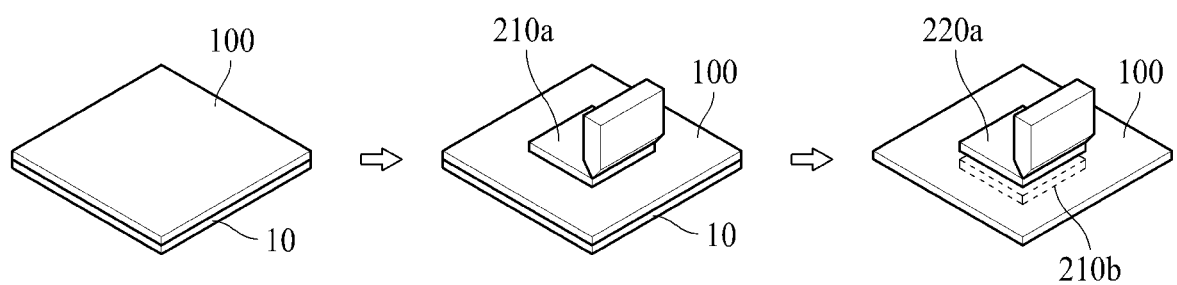
FIG. 2 schematically shows a membrane-electrode assembly manufacturing method according to an embodiment of the present disclosure.

As illustrated in FIG. 2, a membrane-electrode assembly according to the present disclosure may be manufactured through batch processes.

Specifically, a polymer electrolyte membrane 100 having a protective film 10 attached to a second surface thereof is prepared. The protective film 10 is configured to prevent folding or bending of the polymer electrolyte membrane 100 and to perform easy handling of the polymer electrolyte membrane 100 during a process. The material for the protective film 10 is not restricted as long as the material has mechanical properties capable of achieving the above object.

Subsequently, a first catalyst slurry 210a according to the present disclosure is coated on a first surface of the polymer electrolyte membrane 100 so as to have a predetermined shape and size and is then dried to form a first electrode 210b. For example, the first catalyst slurry 210a may be coated using a slot die. Optionally, the first catalyst slurry 210a may be coated while a first masking film (not shown) having a first window of a predetermined shape and size is attached to the first surface such that only the portion of the polymer electrolyte membrane exposed through the first window is coated with the first catalyst slurry 210a.

Subsequently, the protective film 10 is removed from the second surface of the polymer electrolyte membrane 100, and a second catalyst slurry 220a is coated on the second surface so as to have a predetermined shape and size and is then dried to form a second electrode (not shown in FIG. 2). In an embodiment of the present disclosure, the second catalyst slurry 220a is identical to the first catalyst slurry 210a. However, the first and second catalyst slurries 210a and 220a may be different from each other. The second catalyst slurry 220a may also be coated on the second surface so as to have a predetermined shape and size using a slot die or may also be coated on the second surface so as to have a predetermined shape and size using a second masking film (not shown) having a second window.

The first and second masking films are finally removed after the electrodes are formed.

Hereinafter, a membrane-electrode assembly manufacturing method according to another embodiment of the present disclosure will be described with reference to FIG. 3.

As illustrated in FIG. 3, first and second electrodes 210b and 220b may be separately manufactured through a roll-to-roll process.

Figure 3A:
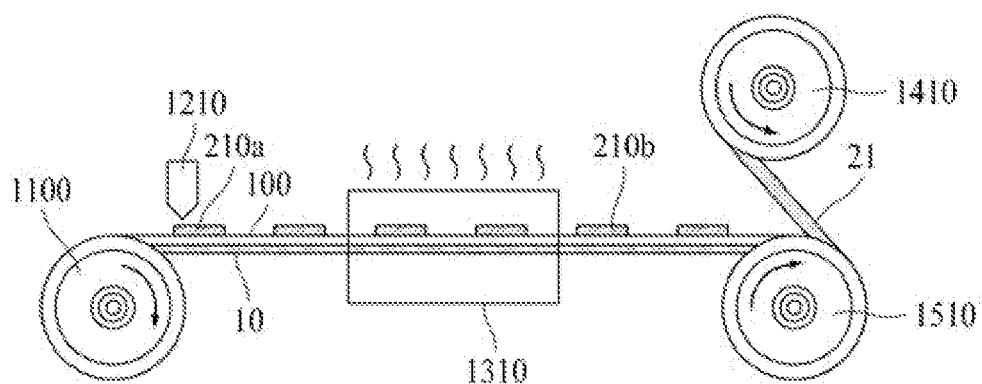
FIGS. 3(a) and 3(b) schematically illustrate a membrane-electrode assembly manufacturing method according to another embodiment of the present disclosure.

As shown in FIG. 3(a), a polymer electrolyte membrane 100 having a protective film 10 attached to a second surface thereof is supplied from a PEM unwinder 1100.

A first coater 1210 coats a first catalyst slurry 210a according to the present disclosure on a first surface of the polymer electrolyte membrane 100 supplied from the PEM unwinder 1100 so as to have a predetermined shape and size. As previously described, the first dispersion medium 213 according to the present disclosure irregularly (i.e. randomly) forms a plurality of grooves G on the first surface of the polymer electrolyte membrane 100 to increase surface roughness thereof.

As the polymer electrolyte membrane 100 having the first catalyst slurry 210a coated thereon passes through a first drying means 1310, a first dispersion medium 213 in the first catalyst slurry 210a is removed, and a first electrode 210b is formed. As previously described, when the first electrode 210b is formed through the drying step, at least some of the grooves G are filled with the first catalyst 211, the first ion conductor 212, or a mixture thereof, whereby the contact area between the first electrode 210b and the polymer electrolyte membrane 100 is increased. Consequently, the adhesive strength between the polymer electrolyte membrane 100 and the first electrode 210b and durability of the interface therebetween are increased.

The polymer electrolyte membrane 100 is wound around a first winder 1510 together with first electrodes 210b formed on the first surface thereof at predetermined intervals and the protective film 10 attached to the second surface thereof. Optionally, as shown in FIG. 3(a), a first protective sheet 21 supplied from a first unwinder 1410 may be wound around the first winder 1510 together with the polymer electrolyte membrane 100 so as to be attached to the first surface having the first electrodes 210b formed thereon. The first protective sheet 21, which is a sheet configured to protect the first electrodes 210b, may be paper or a polymer film.

Figure 3B:
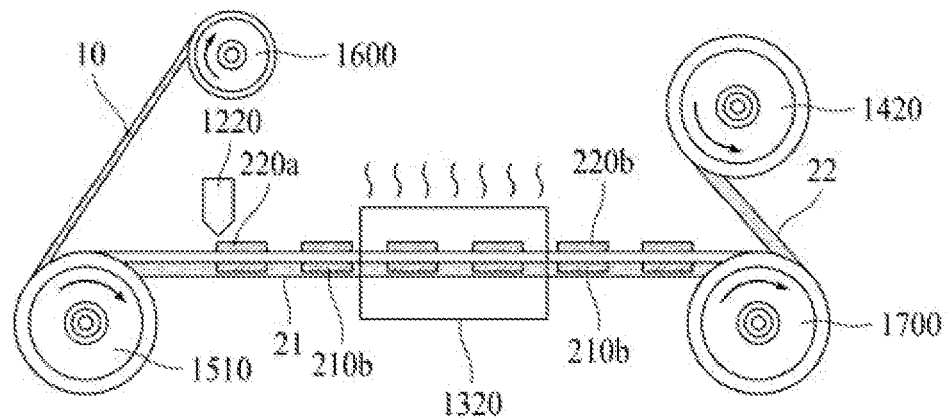

Subsequently, as shown in FIG. 3(b), the polymer electrolyte membrane 100 wound around the first winder 1510, the first electrodes 210b formed on the first surface thereof at predetermined intervals, and the first protective sheet 21 configured to protect the first electrodes 210b are unwound. At this time, the protective film 10 attached to the second surface of the polymer electrolyte membrane 100 is removed from the second surface thereof by a protective film winder 1600.

A second coater 1220 coats a second catalyst slurry 220a according to the present disclosure on the second surface of the polymer electrolyte membrane 100 supplied from the first winder 1510 so as to have a predetermined shape and size. A dispersion medium in the second catalyst slurry 220a also irregularly forms a plurality of grooves G on the second surface of the polymer electrolyte membrane 100 to increase surface roughness thereof.

As the polymer electrolyte membrane 100 having the second catalyst slurry 220a coated thereon passes through a second drying means 1320, the dispersion medium in the second catalyst slurry 220a is removed, and a second electrode 220b is formed. As previously described, when the second electrode 220b is formed through the drying step, at least some of the grooves are filled with a catalyst, an ion conductor, or a mixture thereof, whereby contact area between the second electrode 220b and the polymer electrolyte membrane 100 is increased. Consequently, the adhesive strength between the polymer electrolyte membrane 100 and the second electrode 220b and durability of the interface therebetween are increased.

The polymer electrolyte membrane 100 is wound around an MEA winder 1700 together with first electrodes 210b formed on the first surface thereof at predetermined intervals, second electrodes 220b formed on the second surface thereof at predetermined intervals, and the first protective sheet 21 configured to protect the first electrodes 210b. At this time, as shown in FIG. 3(b), a second protective sheet 22 supplied from a second unwinder 1420 may be wound around the MEA winder 1700 together with the polymer electrolyte membrane 100 so as to be attached to the second surface having the second electrodes 220b formed thereon. The second protective sheet 22, which is a sheet configured to protect the second electrodes 220b, may be paper or a polymer film.

In an alternative embodiment of the present disclosure, the first protective sheet 21 may be temporarily provided between the first electrodes 210b and equipment only during formation of the second electrodes 220b in order to protect the first electrodes 210b and the equipment (i.e. the first protective sheet may not be wound around the MEA winder 1700).

A membrane-electrode assembly manufacturing method according to a further embodiment of the present disclosure will be described with reference to FIG. 4.

Figure 4:
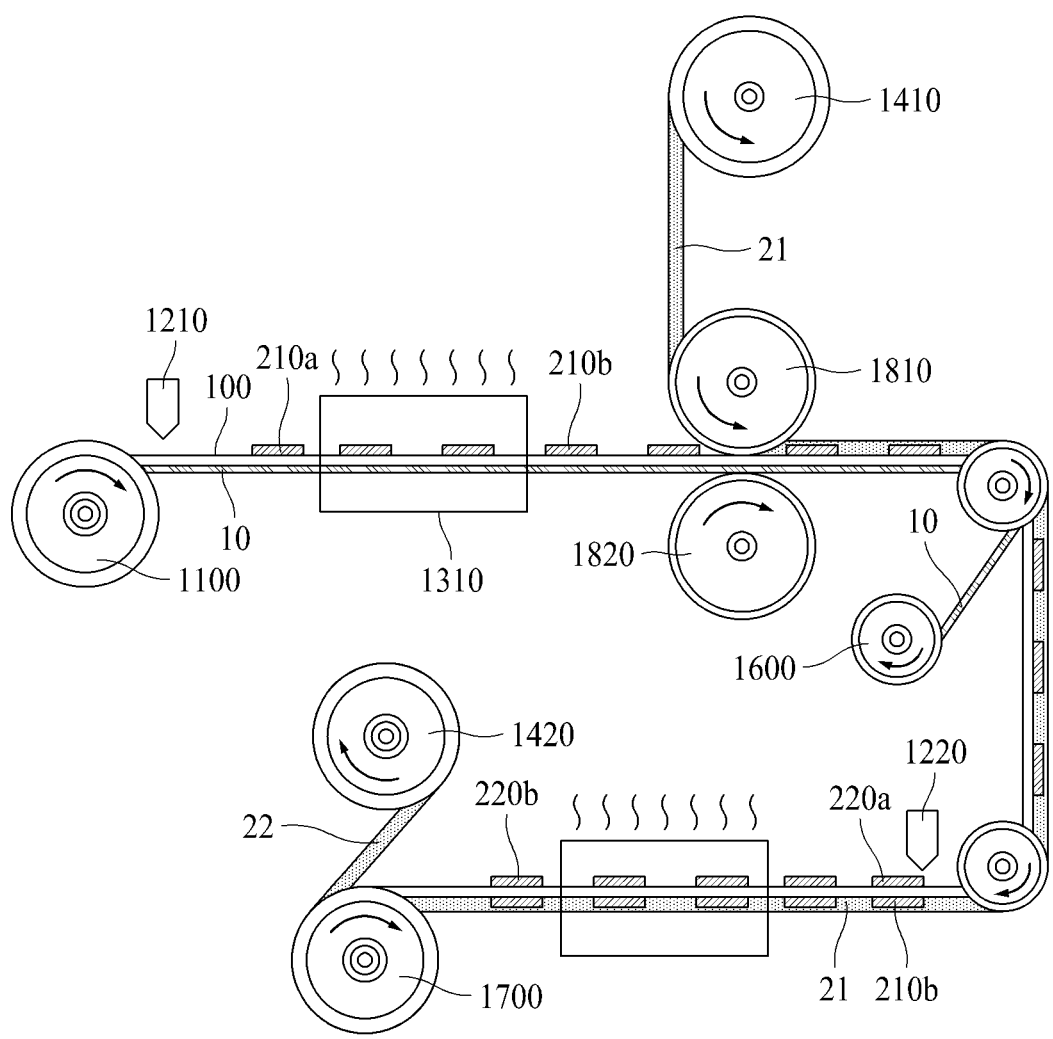
FIG. 4 schematically shows a membrane-electrode assembly manufacturing method according to a further embodiment of the present disclosure.

In the method illustrated in FIG. 3, first and second electrodes 210b and 220b are manufactured through separate roll-to-roll processes, whereas first and second electrodes 210b and 220b are manufactured through a single roll-to-roll process in the method illustrated in FIG. 4.

As shown in FIG. 4, a polymer electrolyte membrane 100 having a protective film 10 attached to a second surface thereof is supplied from a PEM unwinder 1100.

A first coater 1210 coats a first catalyst slurry 210a according to the present disclosure on a first surface of the polymer electrolyte membrane 100 supplied from the PEM unwinder 1100 so as to have a predetermined shape and size. As previously described, the first dispersion medium 213 according to the present disclosure irregularly forms a plurality of grooves G on the first surface of the polymer electrolyte membrane 100 to increase surface roughness thereof.

As the polymer electrolyte membrane 100 having the first catalyst slurry 210a coated thereon passes through a first drying means 1310, a first dispersion medium 213 in the first catalyst slurry 210a is removed, and a first electrode 210b is formed. As previously described, when the first electrode 210b is formed through the drying step, at least some of the grooves G are filled with the first catalyst 211, the first ion conductor 212, or a mixture thereof, whereby the contact area between the first electrode 210b and the polymer electrolyte membrane 100 is increased. Consequently, the adhesive strength between the polymer electrolyte membrane 100 and the first electrode 210b and durability of the interface therebetween are increased.

Subsequently, the polymer electrolyte membrane 100 passes between first and second press rolls 1810 and 1820 together with first electrodes 210b formed on the first surface thereof at predetermined intervals and the protective film 10 attached to the second surface thereof. At this time, as shown in FIG. 4, a first protective sheet 21 supplied from a first unwinder 1410 also passes between first and second press rolls 1810 and 1820, whereby the first protective sheet is attached to the first surface of the polymer electrolyte membrane 100 having the first electrodes 210b formed thereon. As previously described, the first protective sheet 21, which is a sheet configured to protect the first electrodes 210b, may be paper or a polymer film.

Subsequently, as shown in FIG. 4, the protective film 10 attached to the second surface of the polymer electrolyte membrane 100 is removed from the second surface thereof by a protective film winder 1600.

A second coater 1220 coats a second catalyst slurry 220a according to the present disclosure on the second surface of the polymer electrolyte membrane 100 supplied from the first winder 1510 so as to have a predetermined shape and size. A dispersion medium in the second catalyst slurry 220a also irregularly forms a plurality of grooves G on the second surface of the polymer electrolyte membrane 100 to increase surface roughness thereof.

As the polymer electrolyte membrane 100 having the second catalyst slurry 220a coated thereon passes through a second drying means 1320, the dispersion medium in the second catalyst slurry 220a is removed, and a second electrode 220b is formed. As previously described, when the second electrode 220b is formed through the drying step, at least some of the grooves are filled with a catalyst, an ion conductor, or a mixture thereof, whereby contact area between the second electrode 220b and the polymer electrolyte membrane 100 is increased. Consequently, the adhesive strength between the polymer electrolyte membrane 100 and the second electrode 220b and durability of the interface therebetween are increased.

The polymer electrolyte membrane 100 is wound around an MEA winder 1700 together with first electrodes 210b formed on the first surface thereof at predetermined intervals, second electrodes 220b formed on the second surface thereof at predetermined intervals, and the first protective sheet 21 configured to protect the first electrodes 210b. At this time, as shown in FIG. 4, a second protective sheet 22 supplied from a second unwinder 1420 may be wound around the MEA winder 1700 together with the polymer electrolyte membrane 100 so as to be attached to the second surface having the second electrodes 220b formed thereon. The second protective sheet 22, which is a sheet configured to protect the second electrodes 220b, may be paper or a polymer film.

As previously described, alternatively, the first protective sheet 21 may be temporarily provided between the first electrodes 210b and equipment only during formation of the second electrodes 220b in order to protect the first electrodes 210b and the equipment (i.e. the first protective sheet may not be wound around the MEA winder 1700).

Optionally, masking films may be used to form the first and second electrodes 210b and 220b at predetermined intervals so as to consistently have a predetermined shape and size. Specifically, a method according to an embodiment of the present disclosure may further include a step of attaching a first masking film (not shown) having a first window to the first surface before coating the first catalyst slurry 210a on the first surface, a step of removing the first masking film after forming the first electrode 210b, a step of attaching a second masking film having a second window to the second surface before coating the second catalyst slurry 220a on the second surface, and a step of removing the second masking film after forming the second electrode 220b. Consequently, the first catalyst slurry 210a supplied from the first coater 1210 may be coated only on the portion of the first surface exposed through the first window. In the same manner, the second catalyst slurry 220a supplied from the second coater 1220 may be coated only on the portion of the second surface exposed through the second window.

Hereinafter, the present disclosure will be described in detail with reference to concrete examples. However, the following examples are given merely to assist in understanding of the present disclosure, and do not limit the scope of rights of the present disclosure.

Example 1

1 g of a commercial catalyst was put in a reaction vessel and was wetted by water. Subsequently, 0.4 g of ion conductor powder was put in the reaction vessel. Subsequently, 40 g of a dispersion medium containing 60 wt. % of ethanol and 40 wt. % of water was put in the reaction vessel. Subsequently, the catalyst and the ion conductor were dispersed in the dispersion medium using a homogeneous mixer to obtain a catalyst slurry. The content of the dispersion medium in the catalyst slurry was 96.6 wt. %.

The catalyst slurry was coated on a first surface of a fluorine-based polymer electrolyte membrane having a protective film attached to a second surface thereof to a thickness of 130 μm using a slot die while a masking film was attached thereto, and was then dried at a temperature of 80° C. for 180 seconds to form a first electrode. The polymer electrolyte membrane was a reinforced composite membrane type polymer electrolyte membrane including a porous support. After the masking film was removed, a protective sheet was attached to the first surface having the first electrode formed thereon. Subsequently, the protective film was removed from the second surface, and then a masking film was attached to the second surface. The catalyst slurry was coated on the portion of the second surface exposed through a window of the masking film to a thickness of 100 μm using a slot die, and was then dried at a temperature of 80° C. for 100 seconds to form a second electrode. Subsequently, the protective sheet was removed from the first surface, whereby a membrane-electrode assembly was manufactured.

Example 2

A membrane-electrode assembly was manufactured using the same method as in Example 1 except that the content of the dispersion medium in the catalyst slurry was 83.0 wt. %.

Example 3

A membrane-electrode assembly was manufactured using the same method as in Example 1 except that the content of the dispersion medium in the catalyst slurry was 98.0 wt. %.

Example 4

A membrane-electrode assembly was manufactured using the same method as in Example 1 except that the dispersion medium contained 55 wt. % of ethanol and 45 wt. % of water.

Example 5

A membrane-electrode assembly was manufactured using the same method as in Example 1 except that the dispersion medium contained 80 wt. % of ethanol and 20 wt. % of water.

Example 6

A membrane-electrode assembly was manufactured using the same method as in Example 1 except that the dispersion medium contained methanol instead of ethanol.

Example 7

A membrane-electrode assembly was manufactured using the same method as in Example 1 except that the dispersion medium contained propanol instead of ethanol.

Example 8

A membrane-electrode assembly was manufactured using the same method as in Example 1 except that the dispersion medium contained ethoxyethanol instead of ethanol.

Example 9

A membrane-electrode assembly was manufactured using the same method as in Example 1 except that the dispersion medium contained butanol instead of ethanol.

Example 10

A membrane-electrode assembly was manufactured using the same method as in Example 1 except that the dispersion medium contained NMP instead of water.

Example 11

A membrane-electrode assembly was manufactured using the same method as in Example 1 except that the dispersion medium contained THF instead of water.

Comparative Example 1

A membrane-electrode assembly was manufactured using the same method as in Example 1 except that the dispersion medium contained 20 wt. % of ethylene glycol and 80 wt. % of water.

Comparative Example 2

A membrane-electrode assembly was manufactured using the same method as in Example 1 except that the content of the dispersion medium in the catalyst slurry was 80.0 wt. %.

Comparative Example 3

A membrane-electrode assembly was manufactured using the same method as in Example 1 except that the content of the dispersion medium in the catalyst slurry was 98.2 wt. %.

Comparative Example 4

A membrane-electrode assembly was manufactured using the same method as in Example 1 except that the dispersion medium contained 50 wt. % of ethanol and 50 wt. % of water.

Comparative Example 5

A membrane-electrode assembly was manufactured using the same method as in Example 1 except that the dispersion medium contained 90 wt. % of ethanol and 10 wt. % of water.

Comparative Example 6

A membrane-electrode assembly was manufactured using the same method as in Example 1 except that the dispersion medium contained 50 wt. % of ethoxyethanol and 50 wt. % of water.

Comparative Example 7

A membrane-electrode assembly was manufactured using the same method as in Example 1 except that the dispersion medium contained 50 wt. % of isopropyl alcohol and 50 wt. % of water.

[Analysis of Surface and Section of Membrane-Electrode Assembly]

The surface and the section of the membrane-electrode assembly of Example 1 were observed using an optical microscope and a scanning electron microscope.

Figure 5:
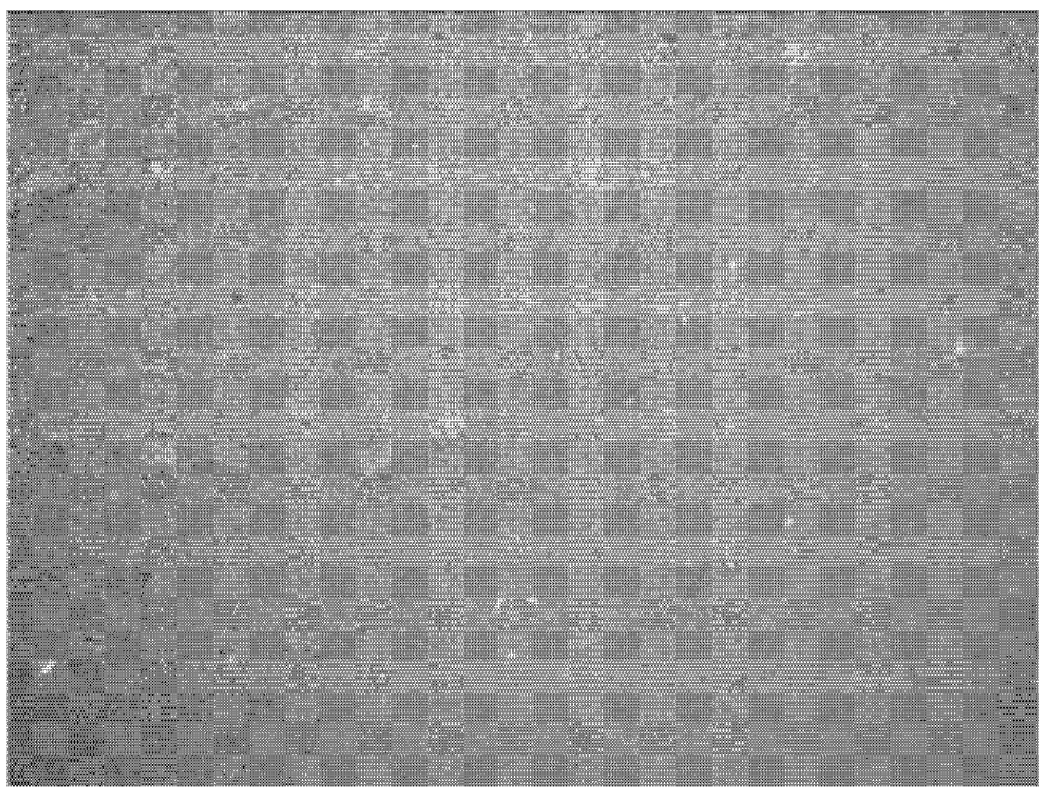
FIG. 5 is an optical micrograph showing the surface of a membrane-electrode assembly obtained in Example 1.

FIG. 5 is an optical micrograph showing the surface of the membrane-electrode assembly obtained in Example 1, and a width of 10 μm or less (indicated by circles) were formed on the surface of the polymer electrolyte membrane and that the grooves were filled with an electrode material. That is, it can be seen that contact area between the electrode and the polymer electrolyte membrane was increased. It is rationally expected that the adhesive strength therebetween and durability of the interface therebetween would be improved due to such an increase in contact area.

In the same manner, it was checked from sectional SEM photographs of Examples 2 to 11 and Comparative Examples 1 to 7 whether grooves each having a depth of 5 μm or less and a width of 10 μm or less were formed on the surface of the polymer electrolyte membrane (the first surface having the first electrode formed thereon). The results are shown in Table 1 below.

TABLE 1

| | Content in catalyst slurry (wt. %) | Dispersion medium | | | | Grooves each having depth of 5 μm or less and width of 10 μm |
|---|---|---|---|---|---|---|
| | | First ingredient | | Second ingredient | | |
| | | Material | Content in dispersion medium (wt. %) | Material | Content in dispersion medium (wt. %) | |
| Example 1 | 96.6 | Ethanol | 60 | Water | 40 | Yes |
| Example 2 | 83.0 | Ethanol | 60 | Water | 40 | Yes |
| Example 3 | 98.0 | Ethanol | 60 | Water | 40 | Yes |
| Example 4 | 96.6 | Ethanol | 55 | Water | 45 | Yes |
| Example 5 | 96.6 | Ethanol | 80 | Water | 20 | Yes |
| Example 6 | 96.6 | Methanol | 60 | Water | 40 | Yes |
| Example 7 | 96.6 | Propanol | 60 | Water | 40 | Yes |
| Example 8 | 96.6 | Ethoxyethanol | 60 | Water | 40 | Yes |
| Example 9 | 96.6 | Butanol | 60 | Water | 40 | Yes |
| Example 10 | 96.6 | Ethanol | 60 | NMP | 40 | Yes |
| Example 11 | 96.6 | Ethanol | 60 | THF | 40 | Yes |
| Comparative Example 1 | 96.6 | Ethylene glycol | 20 | Water | 80 | No |
| Comparative Example 2 | 80.0 | Ethanol | 60 | Water | 40 | No |
| Comparative Example 3 | 98.2 | Ethanol | 60 | Water | 40 | No |
| Comparative Example 4 | 96.6 | Ethanol | 50 | Water | 50 | No |
| Comparative Example 5 | 96.6 | Ethanol | 90 | Water | 10 | No |
| Comparative Example 6 | 96.6 | Ethoxyethanol | 50 | Water | 50 | No |
| Comparative Example 7 | 96.6 | Isopropyl alcohol | 50 | Water | 50 | No |

Figure 6A:
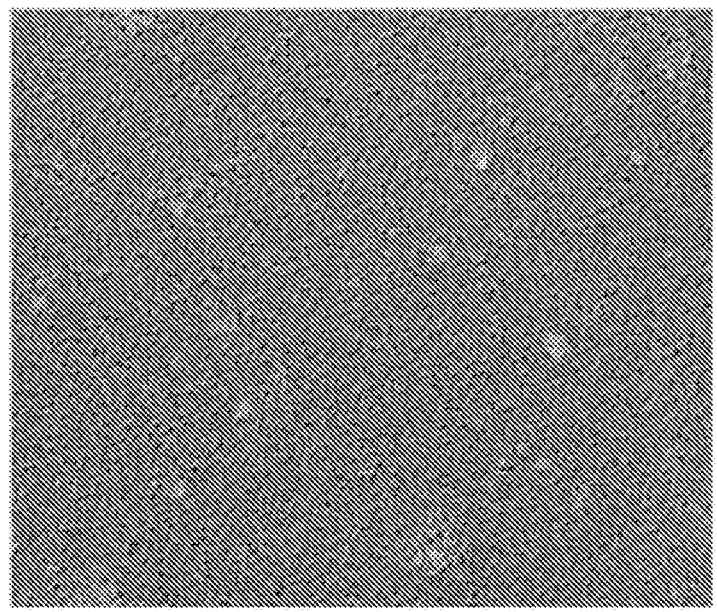
FIGS. 6(a) and 6(b) are scanning electron micrographs respectively showing the surface and the section of the membrane-electrode assembly obtained in Example 1.
Figure 6B:
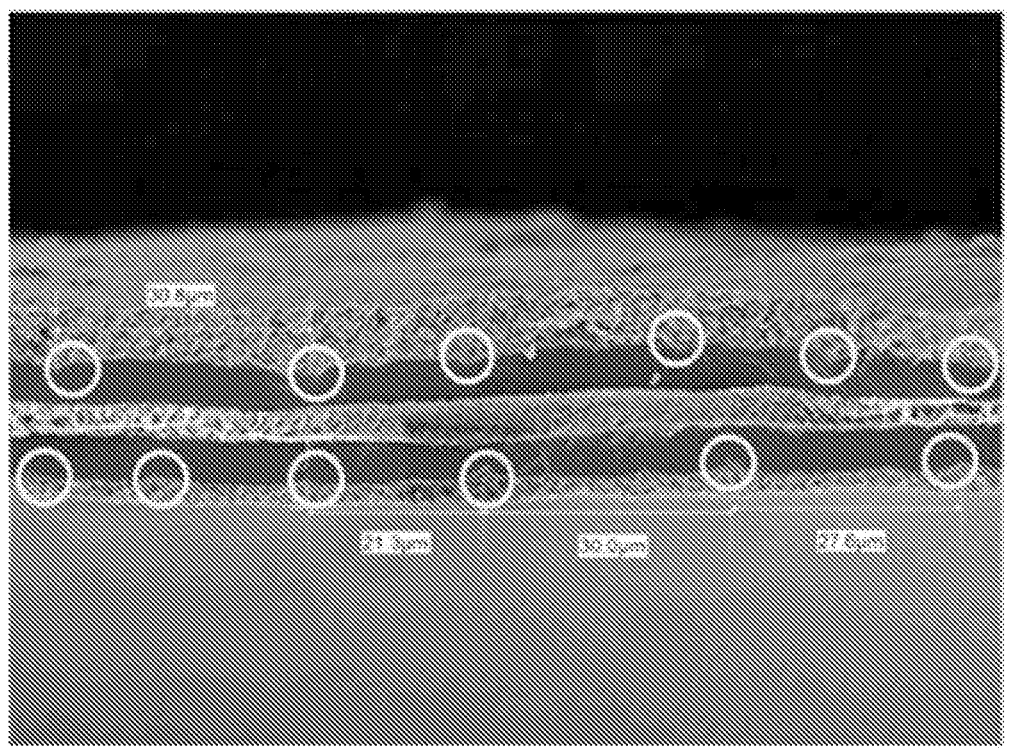

FIGS. 6(a) and 6(b) are scanning electron micrographs (SEM photographs) respectively showing the surface and the section of the membrane-electrode assembly obtained in Example 1.

It can be seen from the surface photographs of FIGS. 5 and 6(a) that, for the membrane-electrode assembly of Example 1, the electrode had a smooth surface without cracks during formation of the electrode, unlike most other methods in which even the surface of the electrode was cracked, even though the electrode was formed simultaneously with an increase in surface roughness of the polymer electrolyte membrane.

Also, it can be seen from a sectional SEM photograph of FIG. 6(b) that grooves each having a depth of 5 μm or less It can be seen from Table 1 above that grooves each having a depth of 5 μm or less and a width of 10 μm or less were formed on the surface of the polymer electrolyte membrane of each of the membrane-electrode assemblies manufactured according to Examples 1 to 11. In contrast, it can be seen that, when the content of the dispersion medium in the catalyst slurry deviated from the range of the present disclosure (Comparative Examples 2 and 3) and when the content of the first ingredient in the dispersion medium deviated from the range of the present disclosure (Comparative Examples 1 and 4 to 7), no grooves each having a depth of 5 μm or less and a width of 10 μm or less were formed. In particular, for Comparative Example 5, in which the content of the first ingredient in the dispersion medium was 90 wt. %, grooves each having a depth of greater than 5 μm and a width of greater than 10 μm were formed.

[Evaluation of Physical Durability and Chemical Durability of Membrane-Electrode Assembly]

Figure 7:
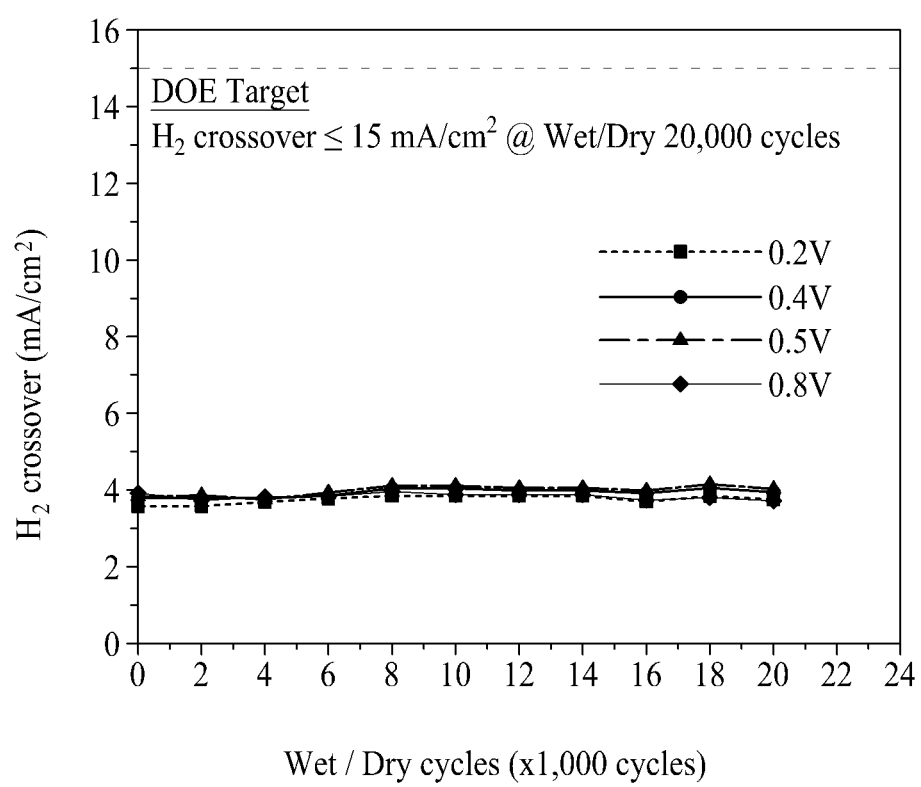
FIG. 7 is a graph showing $H_2$ crossover measured while 20,000 wet/dry cycles were performed on the membrane-electrode assembly obtained in Example 1.

Physical durability and chemical durability of each of the membrane-electrode assemblies of Example 1 and Comparative Example 1 were evaluated based on a durability evaluation protocol of the United States Department of Energy (DOE). Specifically, in order to evaluate physical durability of the membrane-electrode assembly, 20,000 wet/dry cycles were performed, and then $H_2$ crossover was measured. The measured values are shown in Table 2 below. FIG. 7 is a graph showing $H_2$ crossover measured while 20,000 wet/dry cycles were performed on the membrane-electrode assembly obtained in Example 1.

Figure 8A:
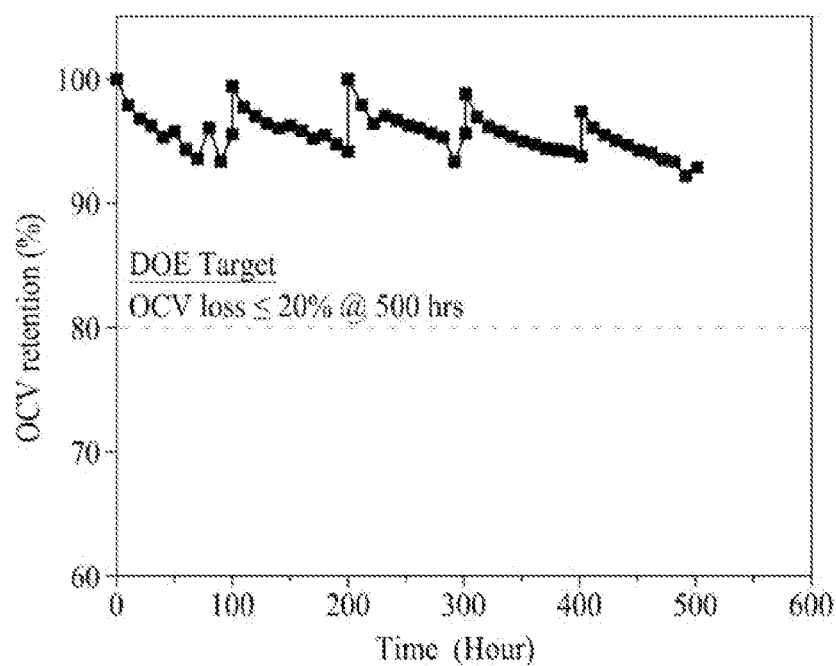
FIGS. 8(a) and 8(b) are graphs respectively showing voltage retention and $H_2$ crossover measured while an OCV hold method was performed for 500 hours on the membrane-electrode assembly obtained in Example 1.
Figure 8B:
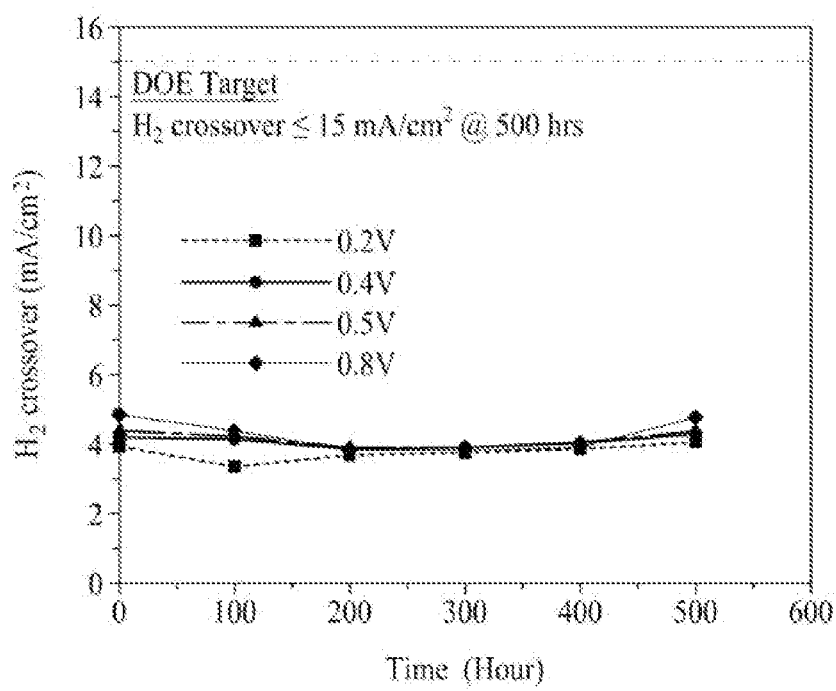

Also, in order to evaluate chemical durability of the membrane-electrode assembly, an OCV hold method was performed for 500 hours, and then $H_2$ crossover and voltage loss were measured. The measured values are shown in Table 2 below. FIGS. 8(*a*) and 8(*b*) are graphs respectively showing voltage retention and $H_2$ crossover measured while the OCV hold method was performed for 500 hours on the membrane-electrode assembly obtained in Example 1.

TABLE 2

|  |  | Example 1 | | Comparative Example 1 | |
| --- | --- | --- | --- | --- | --- |
|  |  | Before evaluation | After evaluation | Before evaluation | After evaluation |
| Wet/dry cycle (20,000 cycles) | $H_2$ crossover @ 0.2 V (mA/cm$^2$) | 3.6 | 3.8 | 3.6 | 9.6 |
| OCV hold (500 hours) | $H_2$ crossover @ 0.2 V (mA/cm$^2$) | 3.9 | 4.1 | 3.9 | 10.6 |
|  | Voltage loss (%) | 0 | 7.7 | 0 | 14.3 |

It can be seen from Table 2 above and the graph of FIG. 7 that the membrane-electrode assembly of Example 1 satisfied DOE standards ($H_2$ crossover≤15 mA/cm$^2$@Wet/Dry 20,000 cycles) and exhibited very stable physical durability before/after durability evaluation, compared to the membrane-electrode assembly of Comparative Example 1. Also, it can be seen from Table 2 above and the graph of FIG. 8 that the membrane-electrode assembly of Example 1 satisfied DOE standards (Voltage loss≤20% @ 500 hrs, $H_2$ crossover≤15 mA/cm$^2$ @ 500 hrs) and exhibited chemical durability having less voltage loss, compared to the membrane-electrode assembly of Comparative Example 1.

The membrane-electrode assemblies of Examples 2 to 11, in each of which grooves each having a depth of 5 μm or less and a width of 10 μm or less were formed on the surface of the polymer electrolyte membrane, also exhibited excellent physical and chemical durabilities, similarly to the membrane-electrode assembly of Example 1. In contrast, the membrane-electrode assemblies of Comparative Examples 2 to 7, in each of which no grooves each having a depth of 5 μm or less and a width of 10 μm or less were formed on the surface of the polymer electrolyte membrane, exhibited relatively low physical and chemical durabilities.

It can be seen from the above results of evaluation that the membrane-electrode assembly manufacturing method according to the present disclosure is capable of improving durability of the membrane-electrode assembly while not deteriorating durability of the polymer electrolyte membrane.

The invention claimed is:

1. A method of manufacturing a membrane-electrode assembly, the method comprising:
   dispersing a first catalyst and a first ion conductor in a first dispersion medium in order to obtain a first catalyst slurry;
   coating the first catalyst slurry on a first surface of a polymer electrolyte membrane; and
   drying the first catalyst slurry coated on the first surface in order to form a first electrode, wherein
   the first dispersion medium comprises (i) a first ingredient capable of partially melting the polymer electrolyte membrane at the first surface thereof or causing deformation of the first surface to form a plurality of grooves on the first surface and (ii) a second ingredient different from the first ingredient,
   the first ingredient is alcohol, acetic acid, propionic acid, dimethylacetamide, or a mixture of two or more thereof,
   the alcohol is methanol, ethanol, propanol, ethoxyethanol, butanol, or a mixture of two or more thereof,
   the second ingredient is water, N-methyl pyrrolidone (NMP), dimethyl sulfoxide (DMSO), tetrahydrofuran (THF), or a mixture of two or more thereof,
   a content of the first dispersion medium in the first catalyst slurry is 83 to 98 wt. %,
   a content of the first ingredient in the first dispersion medium is 55 to 80 wt. %, and
   when the first electrode is formed through the drying step, at least some of the grooves are filled with the first catalyst, the first ion conductor, or a mixture thereof.

2. The method according to claim 1, wherein the first catalyst slurry is coated on the first surface to a coating thickness of 10 to 200 μm.

3. The method according to claim 1, wherein the drying is performed at a temperature of 50 to 150° C. for 10 to 300 seconds.

4. The method according to claim 1, wherein (i) a content of the first dispersion medium in the first catalyst slurry, (ii) a content of the first ingredient in the first dispersion medium, (iii) an coating thickness of the first catalyst slurry, (iv) a temperature of the drying step, and (v) a time of the drying step are set such that each of the grooves has a depth of 5 μm or less and a width of 10 μm or less.

5. The method according to claim 1, wherein the dispersing is performed using at least one selected from a group consisting of an ultrasonic homogenizer, a ball mill, a roll mill, a resonant acoustic mixer, a high-pressure homogenizer, a planetary mixer, and a homogeneous mixer.

6. The method according to claim 1, wherein the polymer electrolyte membrane comprises a fluorine-based ion conductor.

7. The method according to claim 1, wherein the drying is performed by hot-air drying, infrared drying, or hot-plate drying.

8. The method according to claim 1, further comprising:
coating a second catalyst slurry on a second surface of the polymer electrolyte membrane opposite the first surface after forming the first electrode; and
drying the second catalyst slurry coated on the second surface in order to form a second electrode.

9. The method according to claim 8, wherein the coating the first catalyst slurry on the first surface is performed while a protective film is attached to the second surface of the polymer electrolyte membrane.

10. The method according to claim 9, further comprising removing the protective film from the second surface before coating the second catalyst slurry on the second surface.

11. The method according to claim 10, further comprising attaching a first protective sheet to the first surface having the first electrode formed thereon before removing the protective film from the second surface.

12. The method according to claim 11, further comprising attaching a second protective sheet to the second surface having the second electrode formed thereon.

13. The method according to claim 8, further comprising:
attaching a first masking film having a first window to the first surface before coating the first catalyst slurry on the first surface;
removing the first masking film after forming the first electrode;
attaching a second masking film having a second window to the second surface before coating the second catalyst slurry on the second surface; and
removing the second masking film after forming the second electrode, wherein
the coating the first catalyst slurry on the first surface is performed by coating the first catalyst slurry on a portion of the first surface exposed through the first window, and
the coating the second catalyst slurry on the second surface is performed by coating the second catalyst slurry on a portion of the second surface exposed through the second window.

* * * * *